United States Patent [19]

Brugel

[11] Patent Number: 5,663,281

[45] Date of Patent: Sep. 2, 1997

[54] PROCESS FOR PREPARING HIGH MOLECULAR WEIGHT POLYESTERS

[75] Inventor: Edward Gus Brugel, Wilmington, Del.

[73] Assignee: E. I. Du Pont de Nemours and Company, Wilmington, Del.

[21] Appl. No.: 688,477

[22] Filed: Jul. 30, 1996

[51] Int. Cl.$^6$ .................................................. C08G 63/02
[52] U.S. Cl. ........................ 528/272; 528/176; 528/190; 528/191; 528/192; 528/193; 528/194; 528/271
[58] Field of Search ..................................... 528/176, 190, 528/191, 192, 193, 194, 271, 272

[56] References Cited

U.S. PATENT DOCUMENTS

| | | | |
|---|---|---|---|
| 4,590,259 | 5/1986 | Kosky et al. | 528/272 |
| 5,015,759 | 5/1991 | Lowe | 560/91 |

FOREIGN PATENT DOCUMENTS

| | | | |
|---|---|---|---|
| 6-172503 | 6/1994 | Japan | C08G 63/183 |
| 08059810 | 3/1996 | Japan | C08G 63/91 |

*Primary Examiner*—Terressa Mosley
*Attorney, Agent, or Firm*—Charles E. Krukiel

[57] ABSTRACT

An improved process for preparing high molecular weight polyester polymers, such as poly(butylene terephthalate), an alkylene glycol and a di- or tricarboxylic acid by first preparing a pre-polymer in the form of uniform solid particles having an intrinsic viscosity of from 0.1 to about 0.3 dL/gm and a chemical composition which contains greater than a 1% stoichiometric excess of the alkylene glycol above the amount required to produce a high molecular weight polymer, and polymerizing the pre-polymer in the solid state.

9 Claims, No Drawings

PROCESS FOR PREPARING HIGH MOLECULAR WEIGHT POLYESTERS

BACKGROUND OF THE INVENTION

The present invention relates to an improved process for preparing high molecular weight polyester polymers, and, more particularly, to a process for preparing such high molecular weight polymers from the reaction of alkylene glycols and dicarboxylic acids by first preparing a novel pre-polymer in the form of small generally uniform solid particles which has an intrinsic viscosity in the range of from 0.1 to 0.3 dL/gm and, when subjected to Isothermal Thermogravimetric Analysis, exhibits a thermal weight loss of at least about 1.0 weight percent. The process includes the further step of polymerizing the pre-polymer particles to high molecular weight in the solid state.

High molecular weight polyesters are typically produced commercially according to a melt polycondensation process in which an organic dicarboxylic acid, or a dialkyl ester of the dicarboxylic acid, is reacted with an excess of an alkylene glycol in four stages generally as follows:

(1) a (trans)esterification stage during which at least 95% of the carboxylic acid, or methyl ester, groups are converted to the corresponding hydroxyalkylene ester group;

(2) a vacuum flashing stage wherein a portion of the excess alkylene glycol that was introduced for the reaction in stage (1) is removed;

(3) a pre-polymerization stage dating which more excess alkylene glycol from stage (1) is removed from the reaction mass to yield a low molecular weight poly(alkylene dicarboxylate) pre-polymer; and (4) a finishing stage during which any alkylene glycol remaining in the reaction mass is removed and high molecular weight polyester is produced. According to this four-stage commercial process, at least one step, usually three steps, and in some cases all four steps, are carried out at reduced pressure to insure that as much excess alkylene glycol as possible is removed from the system. The removal of alkylene glycol is important because its presence during the finishing step of a conventional process can interfere with further polymerization and the formation of a high molecular weight polymer product.

According to the commercial process described above, alkylene glycol is typically introduced into the (trans) esterification step at levels which are at least from 2 to 3 times, and in some instances up to from 5 to 10 times, the level required to insure a high conversion, e.g., normally at least >95%, of the acid (ester) groups in a minimum of time and at as low a temperature as possible. Generally higher levels of excess alkylene glycol are required when a dicarboxylic acid is used as a reactant in stage (1) than when a dicarboxylic diester is used as a starting reactant.

In addition to conducting the process at reduced pressure, the process, when maintained at elevated temperatures for extended periods of time for the purpose of increasing the molecular weight of the reaction product, can also result in the formation of undesirable by-products. For example, a reaction mixture comprising terephthalic acid, ethylene glycol, antimony oxide (as catalyst) and poly(ethylene terephthalate) held at elevated temperature for an extended period of time can result in the formation of acetaldehyde as a contaminant, and a reaction mixture of terephthalic acid, 1,4-butanediol, tetrabutyl titanate (as catalyst) and poly(butylene terephthalate) held at a temperature in the range of 230° C. for an extended period of time can result in the conversion of the 1,4-butanediol to tetrahydrofuran as an undesirable by-product.

From as early as 1939, it has been known that it is possible to increase the degree of polymerization of certain solid condensation polymers by heating (but not melting them) in an inert gas atmosphere. The phenomenon has been called solid state polymerization, polymer build-up and solid state polycondensation. Increasing the molecular weight of poly(butylene terephthalate) (PBT) by solid state polymerization can be accomplished when the starting PBT pre-polymer, prepared according to a conventional multi-step melt polycondensation process of the type described hereinabove, has an intrinsic viscosity in the range of from 0.5 to 0.7 dL/gm, and a majority, i.e., at least about 95%, of the end groups are in the form of carboxylic esters. However, as the starting intrinsic viscosity decreases below 0.3 dL/gm, the PBT pre-polymer becomes increasingly more difficult to solid-state polymerize to high molecular weight. As described by F. Pilati, et. al. in "A Model Description for Poly(Butylene Terephthalate) Solid-State Polycondensation", Polymer Process Engineering, 4(2–4), 303–319 (1986), the teachings of which are incorporated herein by reference, only by reducing PBT particle size to a powder and increasing the ratio of hydroxyl to carboxylic acid end groups, can one hope to achieve intrinsic viscosities greater than 1.0. However, carrying out solid-state polymerization of a powder is impractical, and it cannot be employed with success on a commercial scale.

The wide use of polyester polymers in fibers, molding resins, films, coatings and the like create a need for an improved process for more efficiently preparing high molecular weight polyester polymers using fewer steps, at lower temperatures, without the risk of forming undesirable by-products, and without the need for substantial vacuum.

SUMMARY OF THE INVENTION

The present invention is an improved process for preparing a high molecular weight polyester polymer having an intrinsic viscosity of at least about 0.5 dL/gm which process comprises:

(A) forming a low molecular weight solid pre-polymer particle by reacting at least one alkylene glycol and at least one di- or tricarboxylic acid according to the steps of:

(i) esterifying the di- or tricarboxylic acid and the alkylene glycol at a temperature in the range of from 150° C. up to 280° C. in the presence of an esterification catalyst in which the molar ratio of alkylene glycol to di- or tricarboxylic acid is from 1.2:1 to 10:1;

(ii) polymerizing the reaction product from step (i) at a temperature in the range of from 180° C. up to about 280° C. to yield a low molecular weight pre-polymer in which at least 85% of the carboxylic acid (ester) groups present initially in the reaction have been converted to hydroxy alkyl ester groups, and the pre-polymer exhibits an intrinsic viscosity in the range of from 0.1 to 0.3 dL/gm and contains greater than 1% stoichiometric excess of alkylene glycol over and above the amount required to produce a high molecular weight polymer;

(iii) isolating the pre-polymer as solid particles; and (B) polymerizing the isolated particles in the solid state.

The present invention, according to another aspect, relates to the formation of a novel polyester pre-polymer as a discreet solid particle(s) which is the product of a reaction between at least one di- or tricarboxylic acid and at least one alkylene glycol wherein the reaction comprises:

(i) esterifying the di- or tricarboxylic acid and the alkylene glycol at a temperature in the range of from 150° C. up to 280° C. in the presence of an esterification catalyst in which the molar ratio of alkylene glycol to di- or tricarboxylic acid is from 1.2:1 to 10:1;

(ii) polymerizing the reaction product from step (i) at a temperature in the range of from 180° C. up to about 280° C. to yield the pre-polymer of the invention which exhibits an intrinsic viscosity in the range of from 0.1 to 0.3 dL/gm and contains greater than 1% stoichiometric excess of alkylene glycol over and above the amount required to produce a high molecular weight polymer; and (iii) isolating the pre-polymer as substantially uniform solid particles.

The present invention resides in the discovery that the subject pre-polymer, formed by the reaction of at least one di- or tricarboxylic acid and at least one alkylene glycol, in which only up to 85% of the carboxylic acid (ester) groups present initially in the reaction have been converted to hydroxy alkyl ester groups, and which contains greater than 1% stoichiometric excess of alkylene glycol above the amount required to otherwise produce a high molecular weight polymer can be successfully polymerized to high commercially significant molecular weight, i.e., greater than 0.5 dL/gm, when the pre-polymer has first been isolated as generally uniform size solid particles, such as, for example, pellets or pastilles, and then polymerized in the solid state. The isolated particles, indicative of their containing within their chemical composition an excess of alkylene glycol, exhibit a thermal weight loss of at least 1.0 weight percent when subjected to Isothermal Thermogravimetric Analysis.

Although vacuum may be employed during any stage of the process described herein, in practice, however, reduced pressure is not needed, i.e., the process of the invention can be operated from start to finish at substantially atmospheric pressure, with fewer steps than conventional processes and at temperatures which substantially reduce the risk of forming undesirable reaction by-products.

DETAILED DESCRIPTION OF THE INVENTION

The present invention is directed to an improved method for polymerizing the reaction product of a di- or tricarboxylic acid and an alkylene glycol. The reaction product is an intermediate, i.e., a pre-polymer, in the form of solid particles, in which only up to about 85% of the starting carboxylic acid (ester) groups have been converted to hydroxy alkylene carboxylic ester groups, and the pre-polymer particles have an intrinsic viscosity between 0.1 to about 0.3 dL/gm. When isolated as generally uniform size solid particles, the pre-polymer is characterized by exhibiting a thermal weight loss of at least 1.0 weight percent when subjected to Isothermal Thermogravimetric Analysis. Stated differently, the pre-polymer contains greater then 1% stoichiometric excess of alkylene glycol over and above the amount required to otherwise produce a high molecular weight polymer according to known polymerization methodology. These uniform size solid particles are subjected to solid state polymerization during which time (a) remaining acid (ester) groups are (trans)esterified;

(b) excess glycol is removed from the pre-polymer; and (c) a high molecular weight polymer is produced substantially simultaneously.

The presence of greater that 1% stoichiometric excess of alkylene glycol over and above the amount required to produce a high molecular weight polymer has unexpectedly been discovered to produce a positive effect on the overall solid-state polymerization process. Specifically, the presence of a stoichiometric excess of alkylene glycol during the initial stage of the solid-state polymerization process reduces the concentration of carboxylic acid end groups, converting them to hydroxy alkylene ester groups. This, in turn, results in a desirably high concentration of hydroxyl end groups, which favors polymerization. The effect of a high hydroxyl/acid end group ratio is then carried through to the later stages of the solid-state polymerization process, assuring the production of high molecular weight polymer, i.e., a polymer product which has an intrinsic viscosity of at least 0.5 dL/gm.

In carrying out the process of the invention, one or more alkylene glycols can be reacted with one or more di- or tricarboxylic acids, although dicarboxylic acids are preferred based on availability and economics. The molar ratio of alkylene glycol to di- or tricarboxylic acid can vary widely as is well known to those skilled in the art. When poly(butylene terephthalate), i.e., PBT, is the desired polyester product, the molar ratio of alkylene glycol to dicarboxylic acid can range from 1.2:1 to 10:1, but it will generally be less than 1.8:1, and preferably in the range of about 1.35:1. The ratio of alkylene glycol to dicarboxylic acid in carrying out the esterification reaction for PBT is not critical, except that the amount of starting alkylene glycol needed is substantially below the 2 to 10 times excess used according to currently known commercial processes. A ratio lower than 1.35:1 can be used satisfactorily, except that at low ratios the dicarboxylic acid/alkylene glycol mixture may become too viscous for the process and/or the objective of having up to or greater than 85% conversion of acid groups will be difficult to achieve. Consequently, a ratio lower than 1.2:1 makes operating the process somewhat impractical on a commercial scale.

The term "alkylene glycol" is used herein to mean a compound having two or more hydroxyl groups which are attached directly to saturated (alkyl) carbon atoms. Other functional groups may also be present in the alkylene glycol, so long as they do not interfere with polymerization. Alkylene glycols having boiling points in the range of from 180° C. up to about 280° C. are most suitable for use according to the invention because of their ability to produce a substantial vapor pressure under solid state polymerization conditions. Suitable alkylene glycols include $HO(CH_2)_nOH$ where n is 2 to 10; 1,4-bis(hydroxymethyl)cyclohexane; 1,4-bis(hydroxymethyl)benzene; bis(2-hydroxyethyl)ether; 3-methyl-1,5-pentanediol; and 1,2,4-butane-triol. Preferred alkylene glycols for their commercial applicability and ease of processing are ethylene glycol; 1,3-propylene glycol; and 1,4-butanediol.

Organic dicarboxylic acids contemplated for use according to the invention are acid compounds which contain two carboxyl groups, such as adipic acid and 1,4-cyclohexane dicarboxylic acid. Preferred for reasons of operability are aromatic dicarboxylic acids, i.e., acid compounds containing two carboxyl groups which are directly bound to the carbon atoms of one or more aromatic rings. Suitable aromatic dicarboxylic acids include terephthalic acid; 2,6-naphthalene dicarboxylic acid; isophthalic acid; 4,4'-bibenzoic acid; bis(4-carboxyphenyl)ether; and 2-chloroterephthalic acid. A suitable aromatic tricarboxylic acid for use according to the invention is 1,2,4-benzenetricarboxylic acid. Preferred for reasons of economy and commercial applicability are terephthalic acid; 2,6-naphthalene dicarboxylic acid; and isophthalic acid.

The acid compounds may contain other functional groups, such as, for example, ether, so long as the presence of any such functional group does not interfere with polymerization. The esterification reaction is followed by a pre-polymerization step in which the reaction mass is held at a temperature in the range of from about 180° C. up to about 280° C. until at least about 85% of the carboxylic acid groups originally present in the reaction have been converted to hydroxy ester groups, and the resulting pre-polymer product has an intrinsic viscosity of from about 0.1 to about 0.3 dL/gm. The pre-polymer reaction product is then isolated, i.e., formed, into small generally uniform size particles which are characterized by exhibiting a thermal weight loss of at least 1.0 weight percent as determined by Isothermal Thermogravimetric Analysis (ITA). The pre-polymer particle is unique in chemical composition in that it contains greater than 1% stoichiometric excess of alkylene glycol over and above the amount required to produce a high molecular weight polymer. In practice, the pre-polymer particle can contain up to 10% stoichiometric excess of alkylene glycol and still polymerize to high molecular weight in the solid state. In a preferred embodiment of the invention, the esterification/pre-polymerization steps are carried out substantially simultaneously, and the isolated pre-polymer particle contains from about 3% to about 7% stoichiometric excess of alkylene glycol.

During ITA, alkylene glycol is volatilized from generally two sources from within the composition of the pre-polymer particle. One source is free, i.e., unreacted, alkylene glycol, and the other source of alkylene glycol is from partially or fully esterified di- or tricarboxylic acid. The pre-polymer particle of the invention is believed to comprise very large amounts of very low molecular weight oligomers of polyester. The amount of alkylene glycol which can be present in the form of a low molecular weight oligomer is believed to increase as the pressure within the collective esterification/pre-polymerization step is changed from partial vacuum to substantially atmospheric pressure. A polyester pre-polymer particle produced according to the invention at substantially atmospheric pressure, therefore, will ordinarily contain higher levels of alkylene glycol in the low molecular weight oligomer form than would otherwise be present if the esterification were carried out at some level of reduced pressure. Thus, it is most desireable to carry out the esterification/pre-polymerization steps of the invention at atmospheric pressure.

Because of the commercial value of the corresponding high molecular weight polyesters, i.e., polyesters having molecular weights of at least 15,000 $M_n$, the preferred combinations of dicarboxylic acid and alkylene glycol for use in practicing the process of the invention are terephthalic acid with ethylene glycol, 1,3-propanediol or 1,4-butanediol; and 2,6-naphthalenedicarboxylic acid with ethylene glycol or hydroxybenzoic acid. With respect to all of these combinations, small amounts, e.g., up to 10 mole percent, of additional alkylene glycol can be present in the resulting polyester pre-polymer particle.

The pre-polymer particles of the present invention can also be prepared by reacting, as starting materials, the di- or trialkyl esters of the above-described di- or tricarboxylic acids, such as, for example, dimethyl terephthalate (DMT), and at least one alkylene glycol until at least about 85% of the methyl ester groups initially present on the DMT have been converted to the corresponding hydroxy alkyl ester. The presence of greater than 1% stoichiometric excess of alkylene glycol in the pre-polymer particles that are produced from a reaction which begins with DMT and alkylene glycol is also advantageous to the continued conversion of methyl ester groups to alkyl ester groups during subsequent solid-state polymerization. The availability of alkylene glycol thereby overcomes the problem of slow or no molecular weight increase otherwise observed during early attempts at solid-state polymerization.

As is well known to those skilled in the art, the exact process conditions can vary within the described ranges of temperature and pressure depending on the polyester being produced. For example, the maximum temperature in solid state polymerization will depend on the melting point of the polyester, since it is desirable to carry out solid-state polymerization at a temperature which is from 2° C. to 10° C. below the melting point of the solid polymer particles. Maximum desirable temperatures in the esterification/pre-polymerization steps will be determined according to whether undesirable side reaction products will tend to form, or by the volatility of the alkylene glycol being used. The temperature generally should be maintained in the range of from 180° C. up to about 280° C. Pressure can vary from atmosphere to a vacuum of about 20 mm Hg, although vacuum is not necessary. The various factors affecting the process and how to vary them for the most part are known to the skilled artisan.

The (trans)esterification reaction is conducted in the presence of a catalyst to obtain a sufficiently rapid reaction rate. Although most esterification catalysts can be used interchangeably, certain catalysts and catalyst concentrations are preferred for individual alkylene glycols. Using the preparation of poly(butylene terephthalate) from 1,4-butanediol as the alkylene glycol and terephthalic acid as the dicarboxylic acid as an example for the discussion which follows, preferred catalysts include hydrocarbyl stannoic acid or anhydride catalysts as described in greater detail in U.S. Pat. No. 4,014,858, the teachings of which are incorporated herein by reference. Other catalysts, such as, for example, tetrabutyl titanate, may also be used with satisfactory results, but the risk of forming undesirable by-products during the reaction may be greater. When 1,3-propylene glycol is the alkylene glycol of choice, the risk of forming undesirable by-products using tetraalkyl titanates as catalyst is not as great. Thus, more traditional esterifications catalysts, e.g., tetrabutyl titanate and antimony oxide, can be used. When the alkylene glycol is ethylene glycol, metal oxide catalysts, such as antimony oxide and n-butyl stannoic acid, produce satisfactory results with minimum risk of undesirable side products being formed. Use of n-butyl stannoic acid and/or antimony oxide as esterification catalyst results in the esterification of terephthalic acid within an acceptable time period of three hours or less.

The amount of catalyst used in the process depends on the starting alkylene glycol and the selected catalyst. When metal alcoholate, acid and/or anhydride catalysts, such as, for example, tetrabutyl titanate or n-butyl stannoic acid, are used in the process, their amounts can typically range from about 0.02% to about 1.0% by weight of total catalyst, based on the total weight of dicarboxylic acid charged to the reactor. When metal oxides, such as antimony oxide, are used as catalysts, their amount can range from 10 ppm up to about 500 ppm.

The formation of the pre-polymer and the resulting pre-polymer particles can be accomplished in a batch, semi-continuous or continuous manner. The reactants should be held within the reaction zone only for a time sufficient to assure that the carboxylic acid (ester) group conversion to hydroxy alkylene carboxylic ester groups of the poly (alkylene terephthalate) has reached at least 85%. This may be determined by titration, but most often the desired conversion will coincide with the reaction mixture turning translucent or clear. In addition, the time the reactants are held within the reaction zone during (trans)esterification and pre-polymerization will also be a function of intrinsic viscosity, i.e., the resulting low molecular weight pre-polymer should have an intrinsic viscosity of less than 0.3 dL/gm, and generally in the range of from about 0.1 to 0.3,dL/gm.

An advantage of the present invention is that a hydroxyl:acid, i.e., hydroxyl alkylene ester:carboxyl acid, end-group ratio of less than 10, and even less than 1, in the solid pre-polymer particles will result in the production of a high molecular weight polymer during solid state polymerization.

In carrying out the process of the invention, it has been observed that the initial esterification of terephthalic acid by the alkylene glycols can take place almost simultaneously with the polymerization of a low molecular weight poly (alkylene terephthalate) pre-polymer. Thus, the esterification and pre-polymerization can be carried out in a single physical step in the same reactor.

Isolation of the pre-polymer is accomplished by forming the pre-polymer into small generally uniform size solid particles by any convenient method, such as, for example, pastillation, flaking, drop-forming, spraying, casting, and the like. Pastillation is the preferred method for isolating the pre-polymer into small particles which are pastilles, i.e., hemispherical particles, which can range from 1 to 14 mm in diameter, although diameters of from 4 mm to 6 mm are satisfactory. Among commercially available pastillators, the "Rotoformer" pastillator available from Sandvik Process Systems, Totowa, N.J., produces very good results in isolating the low molecular weight pre-polymer.

Characterization of the low molecular weight pre-polymer of the invention can best be described by reference to a preferred dicarboxylic acid staring material which is terephthalic acid (TPA). The corresponding low molecular weight poly(alkylene terephthalate) pre-polymer, which is the subject of the invention, has a conversion of carboxylic acid groups to hydroxy alkylene carboxylic ester groups of at least 85%, i.e., a conversion of up to 95% or higher of the carboxylic acid end groups normally required in practicing conventional polycondensation technology is not necessary. Percent conversion can be determined by the following method:

[1] dissolving 1.0±0.2 grams of the poly(alkylene terephthalate) in 25 ml nitrobenzene (dried over molecular sieves) at 150° C.,

[2] cooling the solution to room temperature and adding 25 ml chloroform, 10 ml methanol and 1 ml of a 20% by weight solution of lithium chloride in methanol, and

[3] titrating the solution to an endpoint using approximately 0.1N sodium hydroxide in benzyl alcohol. A blank is obtained by repeating the above titration with all of the ingredients except the poly(alkylene terephthalate). The carboxylic acid group concentration is calculated using the formula:

$$\text{Acid meq/Kg} = \frac{(\text{ml sample} - \text{ml blank}) \times (\text{Normality of Titrant})}{\text{Weight of Sample}} \times 1000$$

The maximum total end group concentration corresponding to a particular poly(alkylene terephthalate) can be determined by converting all end groups to carboxylic acid groups via the following procedure:

[1] approximately 1.0±0.1 gram of the poly(alkylene terephthalate) and 1.0 gm succinnic anhydride are dissolved in 25 ml nitrobenzene (dried over molecular sieves), at 150° C.;

[2] the mixture is maintained at 150° C. for 4 hours;

[3] cooled to room temperature;

[4] 50 ml methanol is added to ensure complete precipitation of the polymer;

[5] the precipitate is filtered and washed two times with fresh methanol; and

[6] dried in vacuum at 100° C. for 12 hours. The total carboxylic acid group concentration is then determined by the above titration method.

The above method is useful for other types of polyesters, but may have to be modified by changing the solvent for the polyester.

The percent conversion of carboxylic acid groups is then calculated according to the following formula in which:

$$\frac{\text{Total End Groups} - \text{Starting Carboxylic Acid Groups}}{\text{Total End Groups}} \times 100 = \% \text{ Conversion}$$

The low molecular weight poly(alkylene terephthalate) particles, which are obtained by esterifying TPA with one or more alkylene glycols, may have an intrinsic viscosity of from 0.1 dL/gm up to about 0.3 dL/gm, as determined on a 0.4% by weight solution of the polymer in 50/50 weight percent trifluoroacetic acid/dichloromethane using a Viscotek® Model Y-501B differential viscometer, at a temperature of 25° C. The viscometer is calibrated with poly (alkylene terephthalate) samples of known viscosity. It is preferred that the poly(alkylene terephthalate) pre-polymer have a minimum intrinsic viscosity of at least about 0.1 dL/gm, but less than about 0.3 dL/gm. An intrinsic viscosity of greater than 0.3 dL/gm requires that the reaction mass remain in the melt longer that would otherwise be necessary, and this, in turn could lead to the production of unwanted side-reactants. An intrinsic viscosity of less than 0.1 dL/gm for the pre-polymer means that the melting point for the resulting solid pre-polymer particles would be too low for removal of excess alkylene glycol via volatilization. This solvent mixture is useful for most polyesters derived from alkylene glycols and aromatic dicarboxylic acids. Other solvents may be used if needed.

An Isothermal Thermolgravimetric Analysis method is used to determine thermal weight loss for isolated solid particles of the pre-polymer. According to the ITA method, an approximate 30 mg sample of poly(alkylene terephthalate) particles is placed in a platinum sample boat of a TA Instruments® Model 2100 Thermogravimetric Analyzer, with a 100 ml/min dry nitrogen flow. The sample is analyzed using the following method:

[1] equilibrate at 35° C.;

[2] ramp 200° C./min to 210° C.±5° C.; and

[3] isothermal at 210° C. for 1000 minutes. The maximum percent weight loss at the end of 1000 minutes is recorded as the "isothermal thermal weight loss" for the poly(alkylene terephthalate) particle.

The amount of free, unreacted, alkylene glycol present in low molecular weight poly(alkylene terephthalate) pre-polymer can be determined by gas chromatography. A 2.0±0.2 gram sample of the pre-polymer is placed in a 25 ml volumetric flask along with a small magnetic stirring bar and 20 ml m-cresol. The mixture is heated to 150° C. and stirred until the pre-polymer is completely dissolved. The mixture is then cooled and m-cresol is added to the volumetric line. The mixture is then stirred an additional 15 minutes. A 1 microliter sample of the mixture is then injected into a Hewlett-Packard Model 5890A gas chromatograph fitted with a 50 meter methyl silicone HP-1 capillary column and a mass spectrometer detector. The initial oven temperature is 40° C. for 4 minutes, followed by a temperature ramp of 10° C./minute to 200° C., and held for 10 minutes. The weight percent of alkylene glycol is calculated using solutions of known alkylene glycol weights, prepared and analyzed as described above.

The amount of alkylene glycol present in the low molecular weight poly(alkylene terephthalate) pre-polymer particles as alkylene terephthalate ester can then be determined by subtracting the weight percent of free, unreacted, alkylene glycol, as determined by the gas chromatography method, from the total excess alkylene glycol as determined by the Isothermal Thermogravimetric Analysis method.

Solid phase polymerization (SSP), or solid phase polycondensation, is well known to those skilled in the art, and is described in greater detail in U.S. Pat. No. 3,801,547, the teachings of which are incorporated herein by reference. The low molecular weight pre-polymer particles, or granules, of the invention are subjected to a temperature of about 180° C. to about 280° C. while in an inert gas stream, e.g., nitrogen, for a period of time sufficient achieve the level of polymerization desired. What is significant and unexpected with respect to the present invention is that low molecular weight solid pre-polymer particles which have the chemical composition described herein and an intrinsic viscosity as low as from 0.1 to 0.3 dL/gm can be polymerized to high molecular weight polymers in the solid state. Furthermore, the physical properties obtained from polymerizing the pre-polymer particles of the invention match or exceed those obtainable by conventional melt condensation.

EXAMPLES

The process of the invention will now be illustrated by reference to the following examples.

Comparative Examples 1 to 3

These Examples illustrate a three-step Conventional Melt Polycondensation Process which is conducted under vacuum. Polymerization is by Solid-State Polymerization at 210° C. for 20 Hours.

A 3 liter reaction kettle, equipped with a mechanical stirrer and distillation head, was charged with terephthalic acid (AMOCO TA-33) 800 grams, 4.819 moles, 1,4-butanediol (DuPont), and 1.0 gm, monobutyl tin oxide (WITCO EURECAT 8200). The reaction kettle was immersed in a metal bath (composition 58% Bi, 42% Sn) held at 220° C. After approximately 30 minutes the reactor contents had reached 200° C. and a distillate flow started. The metal bath was maintained at 220° C. for 110 min., during which time the reactor contents increased in temperature to approximately 217° C. and the reactor head temperature passed through a maximum of 122° C. After approximately 2 hours the reaction solution cleared and the reactor head temperature decreased to less than 80° C. The metal bath temperature was increased to 245° C. and a vacuum of 0.2 turn was pulled on the reaction kettle. The vacuum was maintained at 0.2 mm Hg for 60 minutes, during which time the reactor contents increased in temperature to 244° C. The metal heating bath temperature was lowered and the pre-polymer allowed to cool to room temperature under a low nitrogen sweep. The pre-polymer had an inherent viscosity ("I.V. Start") as shown in Table I, and these values were calculated from GPC measurement. The distillate was collected and analyzed for THF. The data are shown on Table I as moles of THF per mole of Terephthalic Acid charged to the reactor. The PBT polymer was dissolved in nitrobenzene/chloroform and the acidity measured by titration with 0.1N sodium hydroxide in benzyl alcohol. The values are recorded in Table I ("ACID Start").

The pre-polymer was then placed in a heated reservoir at 235°–240° C. and allowed to drip through an orifice onto a stainless steel rotating surface. The stainless steel surface was maintained at less than 40°–50° C. This produced uniform solid particles of pre-polymer having an average weight of 0.300 gm/20 particles with a variation in weight from 0.290 gm/20 particles to 0.3 100 gm/20 particles. The uniform pre-polymer particles had an inherent viscosity of 0.15 dL/gm, as calculated from GPC measurement, indicating a degree of polymerization of 16 and a melting point of 212.12° C.

Approximately 40 gms of the pre-polymer particles were placed in a 50 ml glass tube, one end of which was fitted with a gas inlet which extended up to the full height of the glass tube and the other end was fitted with a gas outlet. Two thermocouples were placed inside the glass tube, one near the bottom and one ¼ of the way from the top of the pre-polymer particles. The glass tube was then placed in a one liter resin kettle containing sufficient silicone fluid to completely immerse the pre-polymer particles. A 25 foot copper tube, through which was flowing nitrogen gas at one liter/min, was immersed in the silicone fluid and the exit end attached to the inlet of the glass tube. The silicone oil was maintained at 160°–161° C. for 2 hours, during which time the thermocouples inside the glass tube indicated a polymer temperature of 160°–161° C. After 2 hours the silicone oil temperature was increased to 210°–211° C. and maintained at that temperature for 20 hours. The polymer particles were then removed and cooled to room temperature. The molecular weight of the PBT polymer was calculated from GPC measurement, and the values are shown in Table I (Col. heading "I.V.", i.e., "Intrinsic Viscosity"). The acidity of the polymers was measured by titration, and the measurements are also recorded in Table I (Col. heading "Final Acid").

Examples 4 to 12

These Examples illustrate the procedure followed in Examples 1–3, but without vacuum.

A 3 liter reaction kettle, equipped with a mechanical stirrer and distillation head, was charged with terephthalic acid (AMOCO TA-33) 800 grams, 4.819 moles, 1,4-butanediol (DuPont Grade), and 1.0 gm, monobutyl tin oxide (WITCO EURECAT 8200). The reaction kettle was immersed in a metal bath (composition 58% Bi, 42% Sn) held at 220° C. After approximately 30 minutes the reactor contents had reached 200° C. and a distillate flow started. The metal bath was maintained at 220° C., during which time the reactor contents increased in temperature to approximately 217° C. and the reactor head temperature passed through a maximum of 122° C. After approximately 2 hours the reaction solution cleared and the reactor head temperature decreased to less than 80° C. The reaction mixture was then held at 217° C. for an additional 60 minutes. The temperature of the metal heating bath was lowered and the pre-polymer was allowed to cool to room temperature under a low nitrogen sweep. The pre-polymer had an inherent viscosity as listed on Table I, as calculated from GPC measurement ("I.V. Start"). The distillate was collected and analyzed for THF, the data is shown on Table I as moles of THF per mole of Terephthalic Acid charged to the reactor. The PBT polymer was dissolved in nitrobenzene/chloroform and the acidity measured by titration with 0.1N sodium hydroxide in benzyl alcohol. The values are shown in Table I ("ACID Start").

The pre-polymer was then placed in a heated reservoir at 235°–240° C. and allowed to drip through an orifice (0.1 in/2.54 mm) onto a stainless steel rotating surface. The stainless steel surface was maintained at less than 40°–50° C. This produced uniform pre-polymer solid particles having a average weight of 0.300 gm/20 particles with a variation in weight from 0.290 gm/20 particles to 0.3100 gm/20 particles. The uniform pre-polymer particles had an inherent viscosity of 0.15 dL/gm, as calculated from GPC measurement, indicating a degree of polymerization of 16 and a melting point of 212.12° C.

Approximately 40 gms of the uniform pre-polymer particles were placed in a 50 ml glass tube, one end of which was fitted with a gas inlet which extends up to the full height of the glass tube and the other end was fitted with a gas outlet. Two thermocouples were placed inside the glass tube, one near the bottom and one ¼ of the way from the top of the uniform pre-polymer particles. The glass tube was then placed in a one liter resin kettle containing sufficient silicone fluid to completely immerse the uniform pre-polymer particles. A 25 foot copper tube, through which was flowing nitrogen gas at one liter/min, was immersed in the silicone fluid and the exit end attached to the inlet of the glass tube. The silicone oil was maintained at 160°–161° C. for 2 hours, during which time the thermocouples inside the glass tube indicated a polymer temperature of 160°–161° C. After 2 hours the silicone oil temperature was increased to 210°–211° C. and maintained at that temperature for 20 hours. The polymer particles were then removed and cooled to room temperature. The molecular weight of the PBT polymer was calculated from GPC measurement, see Table I. The acidity of the polymers was measured by titration, and the results are shown in Table I, Col. heading "Final Acid".

TABLE I

| | Wt. Loss (%) | ACID[1] (Start)[3] | THF mol/mole TPA | I.V.[2] (Start)[3] | I.V.[2] 210° C./ 20 Hrs. | Final Acid meq/kg |
|---|---|---|---|---|---|---|
| Comp. Ex. 1 | 0.85 | 278 | 0.180 | 0.18 | 0.94 | 55 |
| Comp. Ex. 2 | 0.78 | 752 | 0.042 | 0.18 | 0.63 | 96 |
| Comp. Ex. 3 | 0.89 | 30 | 0.225 | 0.34 | 0.94 | 80 |
| Example 4 | 1.70 | 73.2 | 0.080 | 0.16 | 1.02 | 2.4 |
| Example 5 | 2.60 | 18.7 | 0.063 | 0.18 | 1.19 | 11 |
| Example 6 | 2.70 | 306 | 0.131 | 0.14 | 1.20 | 17 |
| Example 7 | 3.18 | 40.9 | 0.108 | 0.15 | 1.42 | 12 |
| Example 8 | 3.07 | 173 | 0.045 | 0.16 | 1.12 | 8.7 |
| Example 9 | 3.84 | 28.5 | 0.050 | 0.13 | 1.53 | 29 |
| Example 10 | 4.15 | 88.2 | 0.092 | 0.15 | 1.60 | 19 |
| Example 11 | 5.42 | 18.1 | 0.057 | 0.13 | 1.26 | 12 |
| Example 12 | 7.75 | 42.6 | 0.039 | 0.10 | 1.25 | 9.6 |

[1]Acid units are meg/kg
[2]Intrinsic Viscosity unit is dL/gm
[3]"Start" means at the beginning of Solid-State Polymerization.

What is claimed is:

1. A process for preparing a high molecular weight polyester polymer having an intrinsic viscosity of at least 0.5 dL/gm which process comprises:

(A) forming a low molecular weight solid pre-polymer particle by reacting at least one alkylene glycol and at least one di- or tricarboxylic acid according to the steps of:

(i) esterifying the di- or tricarboxylic acid with the alkylene glycol at a temperature in the range of from 150° C. up to 280° C. in the presence of an esterification catalyst in which the molar ratio of alkylene glycol to carboxylic acid is from 1.2:1 to 10:1;

(ii) continuing the esterification reaction from step (i) by holding the reaction mass at a temperature in the range of from 180° C. up to about 280° C. until said low molecular weight pre-polymer is formed having a molecular composition which contains greater then 1% stoichiometric excess of alkylene glycol above the amount required to make a high molecular weight polymer and in which at least about 85% of the carboxylic acid groups present initially in the reaction have been converted to ester groups, and the pre-polymer has an intrinsic viscosity of from 0.1 to about 0.3 dL/gm;

(iii) isolating the pre-polymer as generally uniform solid particles; and (B) polymerizing the solid particles in the solid state.

2. The process of claim 1 in which
   (a) the alkylene glycol is selected from the group consisting of $HO(CH_2)_nOH$, where n is 2 to 20; 1,4-bis (hydroxymethyl)cyclohexane; 1,4-bis(hydroxymethyl) benzene; bis(2-hydroxyethyl)ether; 3-methyl-1,5-pentanediol; and 1,2,4-butanetriol;
   (b) the dicarboxylic acid is selected from the group consisting of organic dicarboxylic acids which contain two carboxyl groups; and
   (c) the pre-polymer is isolated into small hemispherical particles by pastillation.

3. The process of claim 1 in which
   (a) the alkylene glycol is selected from the group consisting of $HO(CH_2)_nOH$, where n is 2 to 20; 1,4-bis (hydroxymethyl)cyclohexane; 1,4-bis(hydroxymethyl) benzene; bis(2-hydroxyethyl)ether; 3-methyl-1,5-pentanediol; and 1,2,4-butanetriol;
   (b) the organic di- or tricarboxylic acid is selected from the group consisting of terephthalic acid; 2,6-naphthalene dicarboxylic acid; isophthalic acid; 4,4'-bibenzoic acid; bis(4-carboxyphenyl)ether; 2-chloroterephthalic acid; and 1,2,4-benzenetricarboxylic acid; and
   (c) the catalyst is n-butyl stannoic acid.

4. A polyester pre-polymer in the form of generally uniform solid particles which is the product of a reaction between at least one di- or tricarboxylic acid and at least one alkylene glycol, said pre-polymer having a molecular composition which contains greater than 1% stoichiometric excess of alkylene glycol above the amount required to make a high molecular weight polymer and an intrinsic viscosity of from 0.1 to about 0.3 dL/gm, wherein the reaction comprises:

(a) esterifying the di- or tricarboxylic acid and the alkylene glycol at a temperature in the range of from 150° C. up to 280° C. in the presence of an esterification catalyst;

(b) continuing the esterification reaction from step (a) at a temperature in the range of from 180° C. up to 280° C. until said pre-polymer is formed and at least about 85% of the carboxylic acid groups initially present in the reaction have been converted to ester groups; and (c) isolating the pre-polymer as generally uniform solid particles.

5. The polyester pre-polymer of claim 4 wherein said pre-polymer is selected from the group consisting of poly (ethylene terephathalate), poly(butylene terephthalate) and poly(propylene terephthalate).

6. The polyester pre-polymer of claim 4 in which said alkylene glycol is selected from ethylene glycol, 1,3-propylene glycol, and 1,4-butanediol; said dicarboxylic acid is selected from terephthalic acid, 2,6-naphthalene dicarboxylic acid, and isophthalic acid; and said esterification catalyst is selected from hydrocarbyl stannoic acid, tetrabutyl titanate, and antimony oxide.

7. The process of claim 1 in which said alkylene glycol is selected from ethylene glycol, 1,3-propylene glycol, and 1,4-butanediol; said dicarboxylic acid is selected from terephthalic acid, 2,6-naphthalene dicarboxylic acid, and isothalic acid; and said esterification catalyst is selected from hydrocarbyl stannoic acid, tetrabutyl titanate, and antimony oxide.

8. The process of claim 7 in which said alkylene glycol is 1,4-butanediol and said dicarboxylic acid reactant is an equivalent amount of dimethyl terephthalate.

9. The process of claim 1 which comprises:

(A) forming low molecular weight poly(butylene terephthalate) as solid particles by reacting 1,4-butanediol with terephthalic acid according to the steps of:

(i) esterifying the terephthalic acid with the 1,4-butanediol at a temperature in the range of from 150° C. up to 280° C. in the presence of a catalytic amount of n-butyl stannoic acid wherein the molar ratio of 1,4-butanediol to terephthalic acid is from 1.2:1 to 10:1;

(ii) continuing esterification reaction from step (i) by holding the reaction mass at a temperature of from 180° C. up to 280° C. until said low molecular weight poly(butylene terephthalate) is formed in which not less than 85% of the carboxylic acid groups present initially in the esterification reaction have been converted to ester groups, and said poly(butylene terephthalate) has an intrinsic viscosity of from 0.1 to about 0.3 dL/gm and a molecular composition which contains greater than 1% stoichiometric excess of 1,4-butanediol above the amount required to produce a high molecular weight polymer;

(iii) isolating the low molecular weight poly(butylene terephthalate) from step (ii) as pastilles having an average diameter in the range of from 2 mm to 8 mm; and (B) polymerizing the pastilles by maintaining them at a temperature in the range of from 200° C. to 220° C. while in the presence of an inert gas stream until the intrinsic viscosity of the poly(butylene terephthalate) has increased to at least 0.5 dL/gm.

\* \* \* \* \*